US012447547B2

(12) United States Patent
Davis et al.

(10) Patent No.: US 12,447,547 B2
(45) Date of Patent: Oct. 21, 2025

(54) ELECTRODE EXTENSION DEVICE FOR USE IN WELDING SYSTEMS

(71) Applicant: TipMate Systems, Belpre, OH (US)

(72) Inventors: Randall L. Davis, Belpre, OH (US); Linn E. Yost, Barlow, OH (US)

( * ) Notice: Subject to any disclaimer, the term of this patent is extended or adjusted under 35 U.S.C. 154(b) by 189 days.

(21) Appl. No.: 18/232,432

(22) Filed: Aug. 10, 2023

(65) Prior Publication Data
US 2024/0058886 A1 Feb. 22, 2024

Related U.S. Application Data

(60) Provisional application No. 63/398,660, filed on Aug. 17, 2022.

(51) Int. Cl.
*B23K 9/28* (2006.01)

(52) U.S. Cl.
CPC .................... *B23K 9/282* (2013.01)

(58) Field of Classification Search
CPC .... B23K 9/282; B23K 26/703; B23K 26/082; B23K 26/32; B23K 26/24; B23K 26/28; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066; B23K 26/0626; B23K 26/073; B23K 26/38; B23K 26/0619; B23K 26/0624; B23K 26/53; B23K 26/0006; B23K 26/0676; B23K 26/0861; B23K 2103/56; B23K 2101/40

USPC ......... 219/121.63, 121.64, 121.72, 136, 138, 219/119

See application file for complete search history.

(56) References Cited

U.S. PATENT DOCUMENTS

| 6,847,009 | B2 | 1/2005 | Stuart |
| 10,024,473 | B2 | 7/2018 | Bruckner |
| 2010/0012637 | A1* | 1/2010 | Jaeger .................... B23K 9/323 219/136 |
| 2021/0094112 | A1 | 4/2021 | Henry |

OTHER PUBLICATIONS

International Search Report and Written Opinion of the International Searching Authority for International Patent App. No. PCT/US2023/029937dated as mailed on Nov. 17, 2023 (10 pages).

* cited by examiner

*Primary Examiner* — Phuong T Nguyen

(57) ABSTRACT

A welding apparatus comprising a welding contact tip device configured to receive at least one consumable welding electrode therein, wherein the welding contact tip device includes a first region configured to attach to a welding head and a second region configured to attach to an electrode extension device; and an electrode extension device configured to attach to the welding contact tip device, wherein the electrode extension device includes an upper portion having a predetermined length and a predetermined diameter, wherein the upper portion is configured to create an electrically insulating barrier between the electrode extension device and the welding contact tip device; and a lower portion having a predetermined length, wherein the lower portion is configured to receive at least one consumable welding electrode therein.

18 Claims, 8 Drawing Sheets

ELECTRODE EXTENSION DEVICE FOR USE IN WELDING SYSTEMS

CROSS-REFERENCE TO RELATED APPLICATIONS

This patent application claims the benefit of U.S. Provisional Patent Application Ser. No. 63/398,660 filed on Aug. 17, 2022 and entitled "Electrode Extension for Use in Welding Systems", the disclosure of which is hereby incorporated by reference herein in its entirety and made part of the present U.S. utility patent application for all purposes.

BACKGROUND

The described technology relates in general to welding systems, devices, and methods, and more specifically to accessories for use with arc welding systems that increase the rate at which welding may be performed.

Arc welding is a category of welding technology that includes, for example, flux-cored arc welding, submerged arc welding, and gas metal arc welding, all of which are used to weld together materials referred to as base metals. These types of arc welding typically involve the use of a power source for generating heat by creating an electric arc between a consumable electrode (which may be a wire or a strip) and the base metals. In a typical welding process, the consumable electrode is continuously fed through a torch or guide tube referred to as a weld head or welding head and the electrodes and portions of the base metals melt and fuse together at a welding point between the base metals. The area around the welding point is typically shielded by gas, which is generally inert for welding purposes, or a granular flux for preventing contamination of the molten metal.

A primary objective of commercial welding is the completion of any given welding project in the shortest time possible without sacrificing weld integrity. An increase in welding rate may be accomplished by increasing the current delivered to the electrode from the power source. When more electrical energy is induced by increasing the current delivered to the electrode and the arc, the burn-off rate of the electrode and the deposition rate of the weld are increased. However, larger more expensive power sources are often required to sufficiently increase current levels, making this approach to increase weld rate generally less attractive from a cost perspective.

Another approach to increasing welding rate involves increasing the extension length of the consumable electrode. Electric current is carried by the consumable electrode at the point of electrical contact with a welding contact tip. The current passes through the consumable electrode to the tip of the electrode to establish the arc. The distance from the point of the final electrical contact with the welding contact tip to the tip of the consumable electrode at the arc is identified as the "electrode extension". Once the electrode exits the contact tip the electrode is subject to resistance heating based on the formula I²R, where "I" equates to current, and "R" equates to resistance. The longer the length of the electrode from the point of electrical contact to the arc or the smaller the cross section of the electrode, the greater the heat buildup within the electrode. This effect is due to increased electrical resistance. Electrical contact over the electrode extension must be avoided. An electrode heated to a higher temperature melts faster at the arc than a colder electrode melts given the same welding current. One problem with electrode extension welding absent any support for the electrode is that if the electrode extension is too long, the heat buildup within the electrode may become too intense and the electrode may lose its stiffness. Such a loss in columnar strength makes positioning of the electrode at the welding location difficult due to wandering of the tip.

As will be appreciated by one of ordinary skill in the art of welding, the net result of increasing electrode extension makes the welding process more efficient. When the electrode extension is increased while keeping the welding current constant, the result is a greater quantity of melted electrode and a smaller quantity of melted base metal. As an example, an unguided electrode extension of ¾ inch to 1 inch is commonly used for ³⁄₃₂-inch diameter wire for submerged arc welding of carbon steel. Successful welding can be performed with electrode extension guides up to at least 3 inches (with ³⁄₃₂-inch diameter wire) while providing the same current input. Increases in electrode extension are known to result in significant increases (e.g., greater than 75%) in deposition rate for welds. However, electrode extensions are typically maintained at levels of 20% to 60% deposition rate increase to provide weld integrity in most applications. The burn off rate for a ³⁄₃₂-inch diameter solid carbon steel electrode at a 1-inch electrode extension and 400 amperes (DC+) is approximately 9.5 pounds per hour. The burn off rate for a ³⁄₃₂-inch diameter solid carbon steel electrode at 2¼ inch electrode extension and 400 amperes (DC+) is approximately 13.5 pounds per hour. Essentially, the benefits of increased electrode extension include: (i) increased electrode melting rate; (ii) lower base metal heat input resulting in narrower heat affected zones; (iii) lower heat input for better control of temperature between weld passes; and (iv) lower heat input for less distortion.

Electrode extension devices that prevent electrical contact between the final electrical contact point and the tip of the electrode are known. These extension devices typically incorporate a cylinder that serves as a guide and that utilizes ceramic (or other insulating material) to avoid electrical contact with the electrode over the length of extension. Ceramics can provide most of the basic properties required for a successful electrode guide, such as high temperature resistance, high wear resistance at high temperature, high thermal shock resistance, high mechanical strength, and resistance to the flow of electricity. However, a combination of these properties is possessed only by a few ceramics, such as lava and silicon nitride materials, which suffer from certain limitations. For example, lava cannot accommodate the highest levels of amperage required for some welds. The mechanical properties of ceramics to be considered for increased durability include tensile strength, impact strength, flexural strength, and compressive strength at room temperature and at the elevated temperatures encountered in welding processes. Silicon nitride ceramics possess highly desirable properties (including mechanical properties) when compared to lava and most other available ceramics. Additionally, the dielectric properties of air can be used to prevent electrical conduction between the electrode and the metallic structure of an extension. Welding power sources in the United States are limited for safety purposes by law to a maximum open circuit voltage of 100 volts. This limitation assures that even very thin blankets of air can prevent electrical conductivity at maximum welding amperage.

Known electrode extension devices are typically limited to use with a single electrode and cannot easily be adapted to welding heads that feed two or more parallel electrodes. Welding heads for simultaneously feeding two and three parallel electrodes connected to one power source to increase the burn off rate of the electrodes do exist. Those feeding two electrodes are commonly called twin wire welding heads. However, there has been no apparatus for increasing the electrode extension for multiple electrodes fed through one welding head. Additionally, there is an inherent limitation with available twin wire heads of certain configurations when welding in deeper, narrow welding grooves to cut welding time is desired. Accordingly, an electrode extension device that does not suffer from the described limitations would be advantageous.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a welding apparatus comprising an electrode extension device configured to attach to a welding contact tip device, wherein the electrode extension device includes an upper portion having a predetermined length and a predetermined diameter, wherein the upper portion is configured to create an electrically insulating barrier between the electrode extension device and the welding contact tip device; and a lower portion having a predetermined length, wherein the lower portion is configured to receive at least one consumable welding electrode therein.

The electrode extension device may further include a middle portion positioned between the upper portion and the lower portion, wherein the middle portion is greater in diameter than the upper portion and includes a predetermined geometry that may be hexagonal, for example. The upper portion of the electrode extension device may further include a plurality of apertures formed therein at predetermined locations; an electrically non-conductive spherical bearing inserted into each aperture in the plurality of apertures such that a portion of each non-conductive spherical bearing extends a predetermined distance out of each aperture; and a cylindrical sleeve positioned around the upper portion of the electrode extension device to cover the apertures and bearings. The welding apparatus may further include a welding contact tip device configured to receive at least one consumable welding electrode therein, wherein the welding contact tip device comprises a first region configured to attach to a welding head; and a second region configured to attach to the electrode extension device, wherein the second region further includes a plurality of grooves formed thereon at predetermined locations. The electrode extension device may be connected to the welding contact tip device by placing the extending portions of the electrically non-conductive spherical bearings in the grooves formed on the welding contact tip and twisting the electrode extension device to form a bayonet-type fitting. The connection between the electrode extension device and the welding contact tip device defines an electrically insulating air gap between an inner surface of the upper portion of the electrode extension device and an outer surface of the welding contact tip device. The welding contact tip device may be configured as a contact tip holder through which the at least one consumable welding electrode passes without receiving electrical contact and may be configured to receive one or more replaceable contact tips at one end thereof for providing electrical contact to the at least one consumable welding electrode. Accordingly, the lower portion of the electrode extension device can be modified to include a region for housing the replaceable contact tips and forming an air pocket between the replaceable contact tips and the electrode extension device when the electrode extension device is attached to the welding contact tip device. The non-conductive spherical bearings may be manufactured from silicon nitride, materials containing silicon nitride, or other materials having insulating properties. The electrode extension device and cylindrical sleeve may be manufactured from copper, materials containing copper, or other materials capable of resisting welding heat and wear at high temperatures.

Another implementation of the disclosed technology provides a welding apparatus comprising a welding contact tip device configured to receive at least one consumable welding electrode therein, wherein the welding contact tip device comprises a first region configured to attach to a welding head; and a second region configured to attach to an electrode extension device, wherein the second region further includes a plurality of grooves formed thereon at predetermined locations; and an electrode extension device configured to attach to the welding contact tip device, wherein the electrode extension device includes an upper portion having a predetermined length and a predetermined diameter, wherein the upper portion is configured to create an electrically insulating barrier between the electrode extension device and the welding contact tip device; and a lower portion having a predetermined length, wherein the lower portion is configured to receive at least one consumable welding electrode therein.

The electrode extension device may further include a middle portion positioned between the upper portion and the lower portion, wherein the middle portion is greater in diameter than the upper portion and includes a predetermined geometry, which may be hexagonal. The upper portion of the electrode extension device may further include a plurality of apertures formed therein at predetermined locations; an electrically non-conductive spherical bearing inserted into each aperture in the plurality of apertures such that a portion of each non-conductive spherical bearing extends a predetermined distance out of each aperture; and a cylindrical sleeve positioned around the upper portion of the electrode extension device to cover the apertures and bearings. The electrode extension device may be connected to the welding contact tip device by placing the extending portions of the electrically non-conductive spherical bearings in the grooves formed on the welding contact tip device and twisting the electrode extension device to form a bayonet-type fitting. The connection between the electrode extension device and the welding contact tip device defines an electrically insulating air gap between an inner surface of the upper portion of the electrode extension device and an outer surface of the welding contact tip device. The welding contact tip device may be configured as a contact tip holder through which the at least one consumable welding electrode passes without receiving electrical contact and may be configured to receive one or more replaceable contact tips at one end thereof for providing electrical contact to the at least one consumable welding electrode. Accordingly, the lower portion of the electrode extension device can be modified to include a region for housing the replaceable contact tips and forming an air pocket between the replaceable contact tips and the electrode extension device when the electrode extension device is attached to the welding contact tip device The non-conductive spherical bearings may be manufactured from silicon nitride, materials containing silicon nitride, or other materials having insulating properties. The electrode extension device and cylindrical sleeve may be manufactured from copper, materials containing copper, or other materials capable of resisting welding heat and wear at high temperatures.

Still another implementation of the disclosed technology provides a welding apparatus comprising a welding contact tip device configured to receive at least one consumable welding electrode therein, wherein the welding contact tip device comprises a first region configured to attach to a welding head; and a second region configured to attach to an electrode extension device, wherein the second region further includes a plurality of grooves formed thereon at predetermined locations; and an electrode extension device configured to attach to the welding contact tip device, wherein the electrode extension device includes an upper portion having a predetermined length and a predetermined diameter, wherein the upper portion is configured to create an electrically insulating barrier between the electrode extension device and the welding contact tip device, and wherein the upper portion further includes a plurality of apertures formed therein at predetermined locations; an electrically non-conductive spherical bearing inserted into each aperture in the plurality of apertures such that a portion of each non-conductive spherical bearing extends a predetermined distance out of each aperture; and a cylindrical sleeve positioned around the upper portion of the electrode extension device to cover the apertures and bearings; and a lower portion having a predetermined length, wherein the lower portion is configured to receive at least one consumable welding electrode therein; and a middle portion positioned between the upper portion and the lower portion, wherein the middle portion is greater in diameter than the upper portion and includes a predetermined geometry, which may be hexagonal.

The electrode extension device may be connected to the welding contact tip device by placing the extending portions of the electrically non-conductive spherical bearings in the grooves formed on the welding contact tip device and twisting the electrode extension device to form a bayonet-type fitting. The connection between the electrode extension device and the welding contact tip device defines an electrically insulating air gap between an inner surface of the upper portion of the electrode extension device and an outer surface of the welding contact tip device. The welding contact tip device may be configured as a contact tip holder through which the at least one consumable welding electrode passes without receiving electrical contact and may be configured to receive one or more replaceable contact tips at one end thereof for providing electrical contact to the at least one consumable welding electrode. Accordingly, the lower portion of the electrode extension device can be modified to include a region for housing the replaceable contact tips and forming an air pocket between the replaceable contact tips and the electrode extension device when the electrode extension device is attached to the welding contact tip device.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Figure 1:
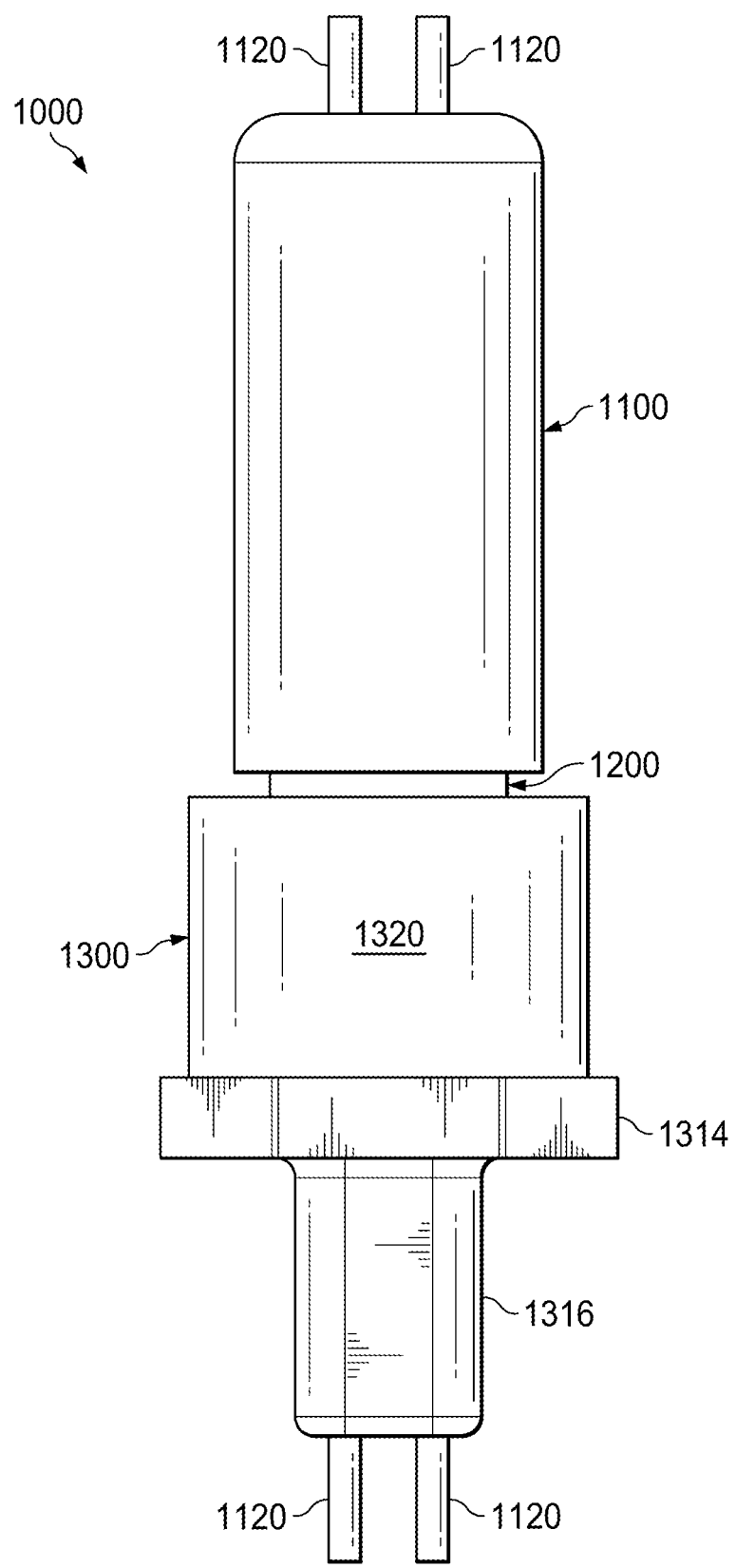
FIG. 1 is an external side view of a welding assembly in accordance with a first example implementation of the disclosed technology, wherein a contact tip used with a welding apparatus has been configured to attach to a welding head and to an electrode extension device.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

Certain commercially available twin wire welding heads include a contact tip holder through which two continuously fed consumable electrodes are passed. The contact tip holder is typically attached to the welding head using a lock nut or set screws. Two contact tips are then attached to the tip holder by threads to provide electrical contact with the electrodes. The contact tip holder may be manufactured as a one-piece (monolithic) welding contact tip having two holes. An example of the function of a contact tip being integrated into a contact tip holder is Part Number PX S14033-5/64 (et. al) (Profax; Pearland, T X, 2021-2022 catalog). Implementations of the disclosed technology provide electrode extension devices (also referred to as electrode extensions) configured to mount on or attach to contact tip devices used with welding systems and assemblies, wherein non-conductive materials are utilized to electrically insulate the electrode extension devices from the welding contact tip devices while still permitting continuous feeding of one or more consumable welding electrodes through both the contact tip devices and the electrode extension devices. For the sake of clarity, it should be understood that the phrase "contact tip device" as used herein refers to both monolithic contact tips that provide electrical contact to the consumable electrodes and to contact tip holders, through which the consumable electrodes pass, but that do not provide electrical contact to the consumable electrodes.

Figure 2:
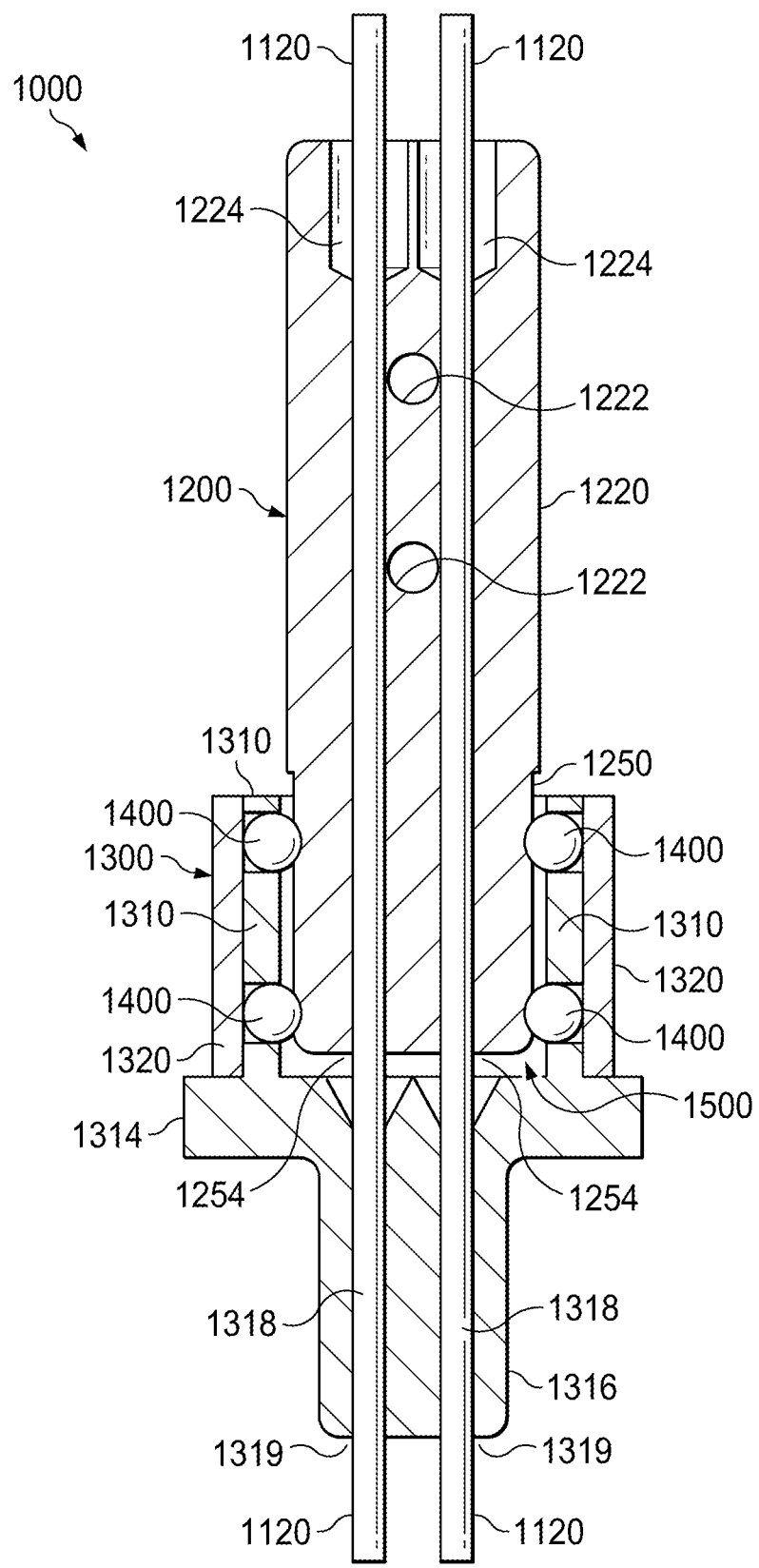
FIG. 2 is a cross-sectional side view of the welding assembly of FIG. 1 with the welding head removed depicting the internal structure of the contact tip and the electrode extension device.
Figure 3A:
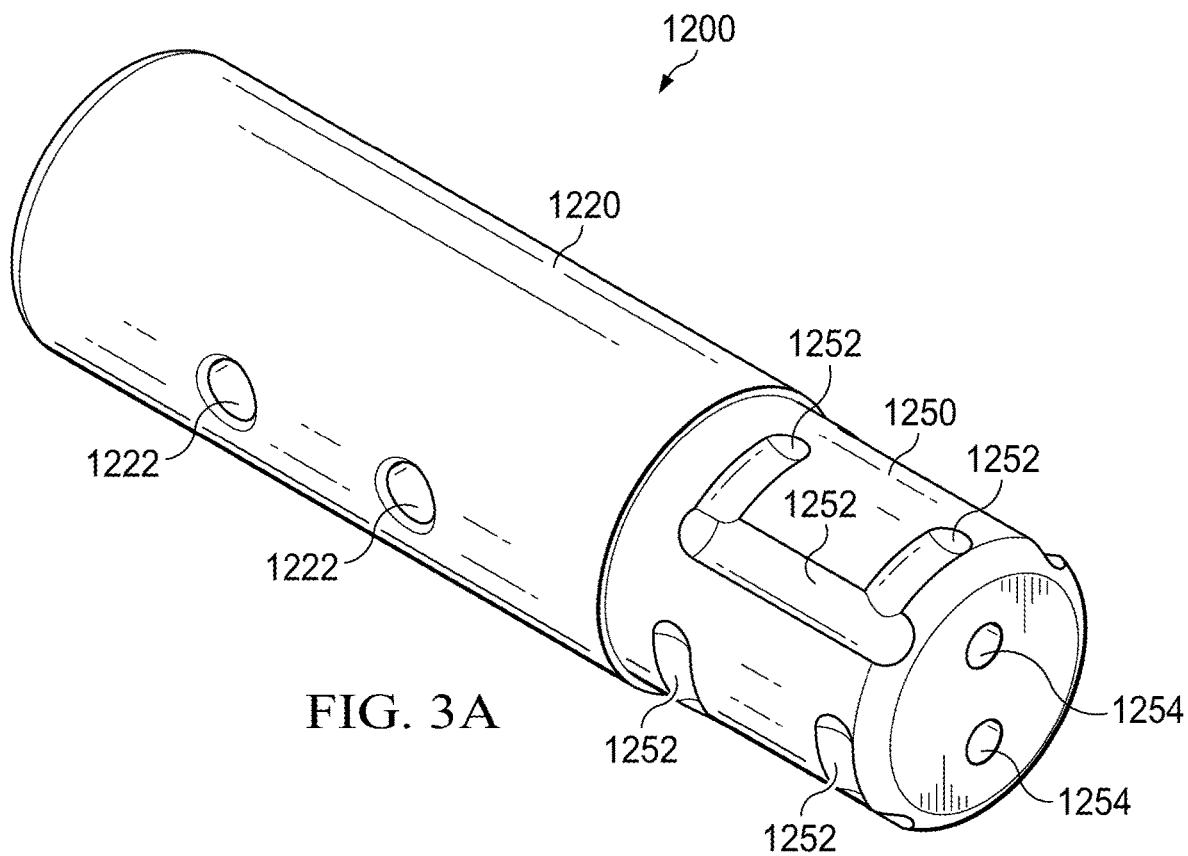
FIG. 3A is an external, perspective view of the contact tip of the welding assembly of FIG. 1 depicting various structural features of the contact tip.
Figure 3B:
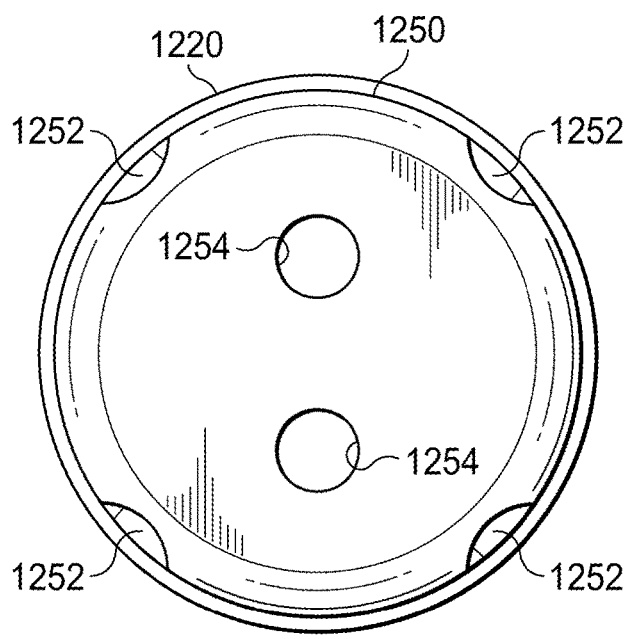
FIG. 3B is an external, end view of the contact tip of the welding assembly of FIG. 1 depicting various structural features of the contact tip.
Figure 4A:
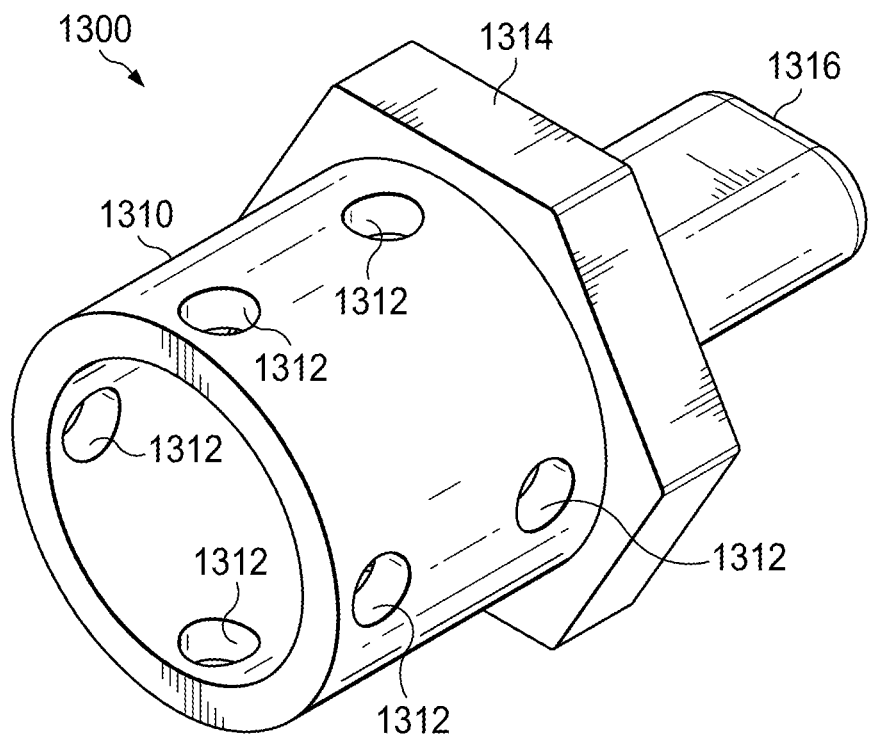
FIG. 4A is an external, perspective view of the electrode extension device of the welding assembly of FIG. 1 depicting various structural features of the electrode extension device.
Figure 4B:
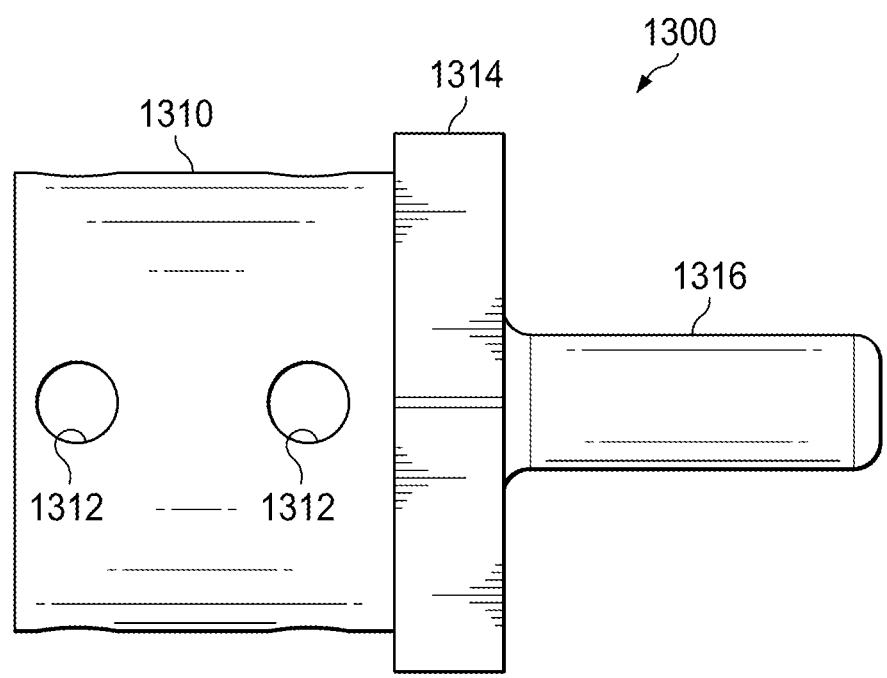
FIG. 4B is an external, side view of the electrode extension device of the welding assembly of FIG. 1 depicting various structural features of the electrode extension device.

FIG. 1 provides an external side view of a welding assembly in accordance with a first example implementation of the disclosed technology, wherein a contact tip has been configured to attach to a welding head and to an electrode extension component or device. FIG. 2 provides a cross-sectional side view of the welding assembly of FIG. 1 with the welding head removed depicting the internal structure of the contact tip and the electrode extension device. FIG. 3A provides an external, perspective view of the contact tip of the welding assembly of FIG. 1 depicting various structural features of the contact tip. FIG. 3B provides an external, end view of the contact tip of the welding assembly of FIG. 1 depicting various structural features of the contact tip. FIG. 4A provides an external, perspective view of the electrode extension device of the welding assembly of FIG. 1 depicting various structural features of the electrode extension device. FIG. 4B provides an external, side view of the electrode extension device of the welding assembly of FIG. 1 depicting various structural features of the electrode extension device.

With specific reference to FIGS. 1-2, 3A-3B, and 4A-4B, welding assembly 1000 includes welding head 1100, which is attached to contact tip 1200, which itself is attached to electrode extension device 1300. Single or multiple consumable electrodes 1120, which are used in various welding processes, pass completely through both contact tip 1200 and electrode extension device 1300. In the example implementation shown in these Figures, contact tip 1200 is monolithic (i.e., manufactured from a single piece of material (e.g., copper or similar material)) and includes welding head attachment portion 1220 and electrode extension device attachment portion 1250. Contact tip 1200 provides electrical contact to consumable electrodes 1120. Welding head 1100 of a welding gun, welding torch, or similar instrument or tool is mounted on welding head attachment portion 1220 using threaded holes 1222. In other implementations not shown in the Figures, welding head 1100 may be attached to contact tip 1200 using locknuts and flange arrangements or other mechanical attachment systems. Internal channels 1224 are formed within contact tip 1200 and provide internal passages for consumable electrodes 1120, which exit contact tip 1200 through exit holes 1254 (see FIG. 2). Electrode extension device attachment portion 1250, which has a diameter slightly less than the diameter of welding head attachment portion 1220 (note: in other implementations, electrode extension device attachment portion 1250 has a diameter the same as or greater than the diameter of welding head attachment portion 1220), includes a plurality of grooves 1252 formed in the surface thereof (see FIGS. 3A-3B), which may have an L-shape or other predetermined geometry. Electrode extension device 1300 includes internal cylinder 1310 in which a plurality of apertures 1312 (e.g., eight apertures) have been formed, hexagonal base 1314, and electrode housing 1316 (see FIGS. 4A-4B). Internal channels 1318 are formed within electrode extension device 1300 and provide internal passages for consumable electrodes 1120, which pass though electrode housing 1316 and exit electrode extension device 1300 through exit holes 1319 (see FIG. 2). External cylinder or sleeve 1320 is mounted over internal cylinder 1320.

As best shown in FIG. 2, electrode extension device 1300 is attached or connected to contact tip 1200 using an insulating bayonet-type fitting or mounting. Apertures 1312, which are formed in internal cylinder 1310 of electrode extension device 1300 (using a ball end mill or similar device), are each configured to receive a spherical, non-conductive bearing 1400 therein. The diameter of each aperture 1312 is slightly smaller than the diameter of each bearing 1400, thereby allowing bearings 1400 to be pressed into apertures 1312 to create an interference fit between the bearings and the apertures. External cylinder 1320 is then securely mounted on internal cylinder 1310 to prevent bearings 1400 from exiting apertures 1312. With bearings 1400 and external cylinder 1320 in place, electrode extension device 1300 is then mounted on electrode extension device attachment portion 1250 of contact tip 1200 by aligning bearings 1400 with grooves 1252 and twisting electrode extension device 1300 to form a connection between the two components. Attachment of electrode extension device 1300 to contact tip 1200 may be facilitated or enhanced by milling grooves 1252 to have variable characteristics such as, for example, variable depths along the length of each groove as shown in FIG. 3A. Such characteristics permit an effective interference action (i.e., twist-lock) when bearings 1400 are properly positioned in grooves 1252. Additionally, grooves 1252 and bearing 1400 are positioned to align internal channels 1318 with internal channels 1225 when electrode extension device 1300 is properly connected to contact tip 1200. Bearings 1400 are positioned within apertures 1312 and grooves 1252 such that insulating air gap 1500 is maintained after electrode extension device 1300 has been connected to contact tip 1200. After consumable electrodes 1120 have been fed through electrode extension device 1300, electrode extension device 1300 is further locked to electrode extension device attachment portion 1250.

Figure 5:
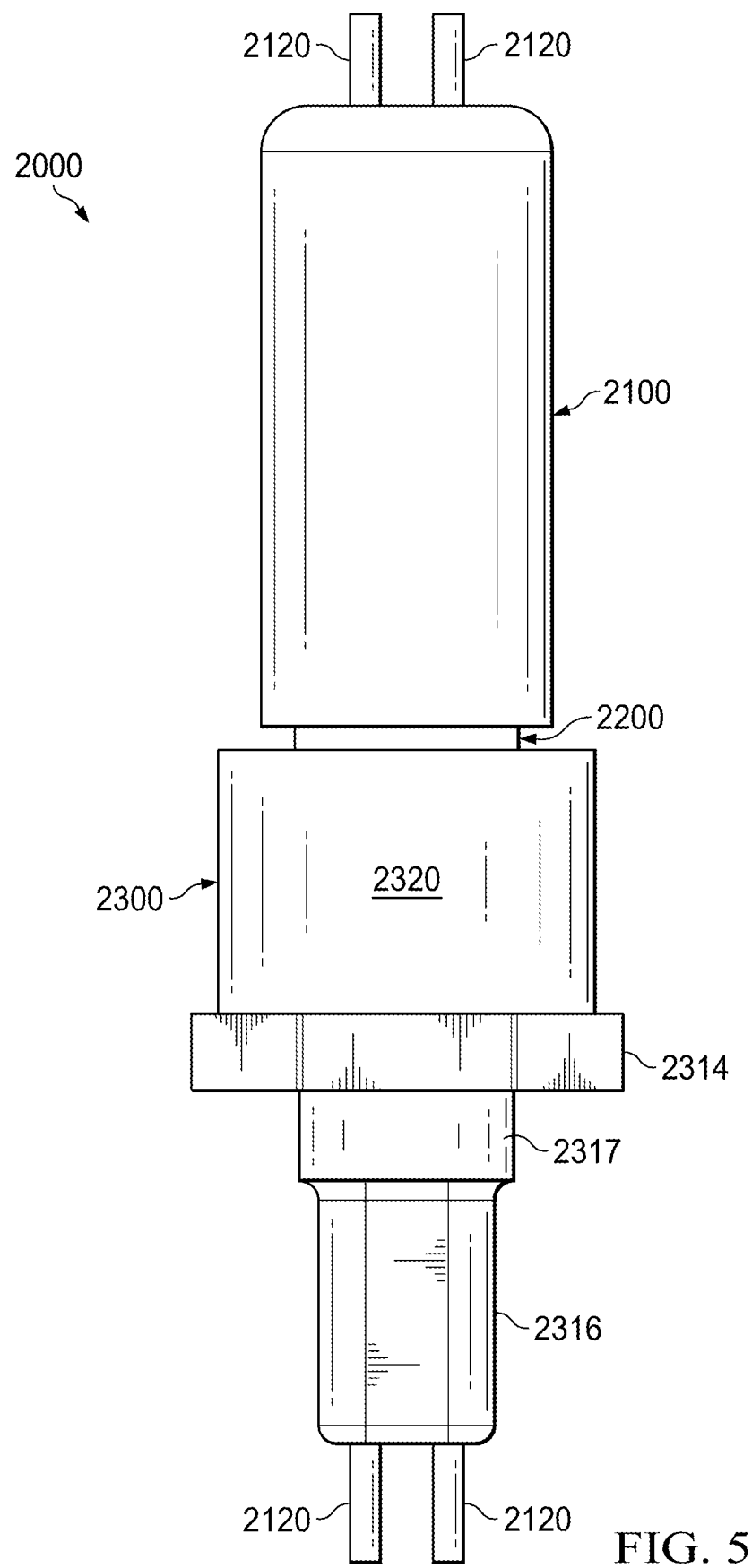
FIG. 5 is an external side view of a welding assembly in accordance with a second example implementation of the disclosed technology, wherein a contact tip holder used with a welding apparatus has been configured to attach to a welding head and to an electrode extension device.
Figure 6:
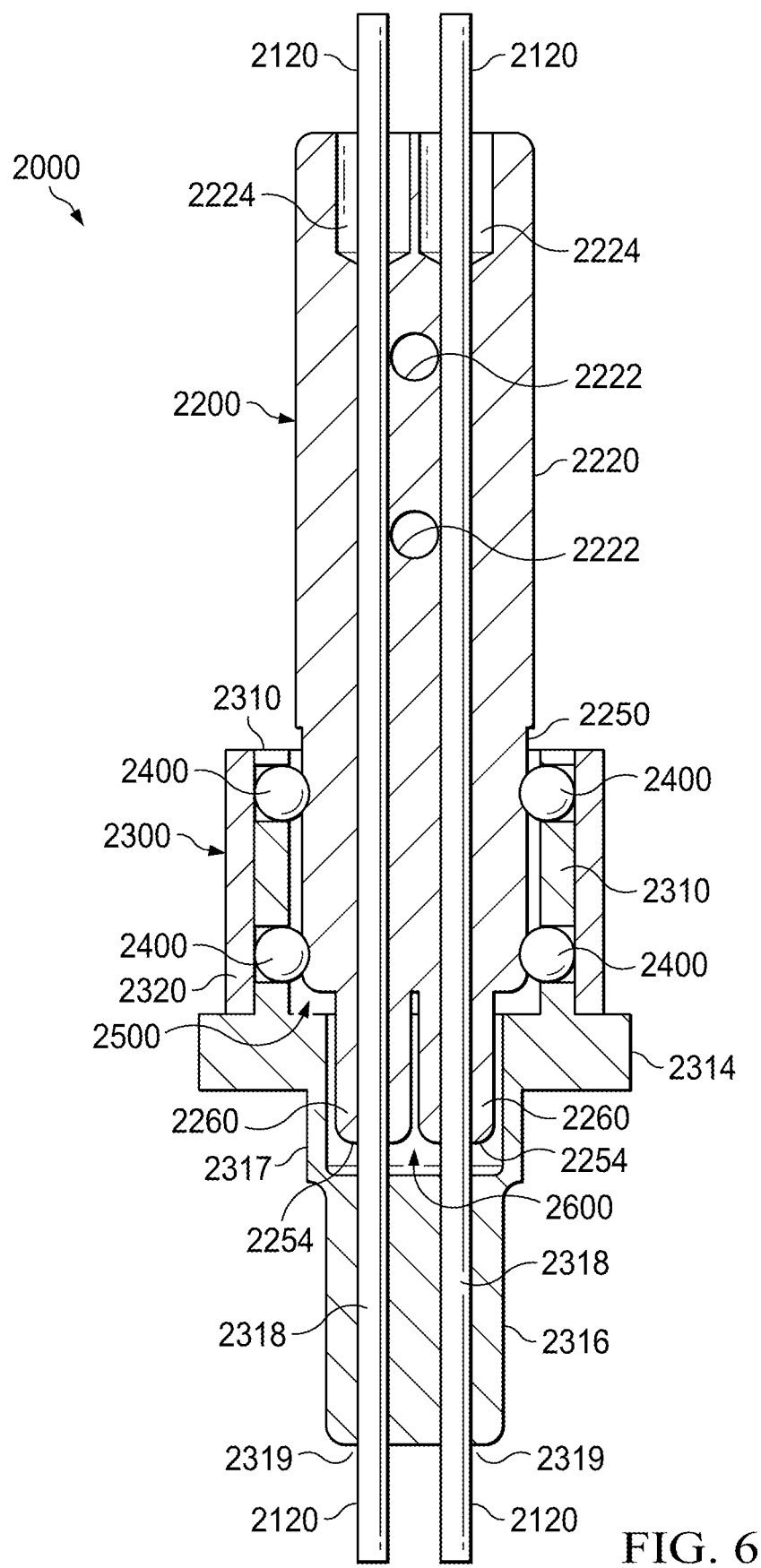
FIG. 6 is a cross-sectional side view of the welding assembly of FIG. 5 with the welding head removed depicting the internal structure of the contact tip holder and the electrode extension device.
Figure 7A:
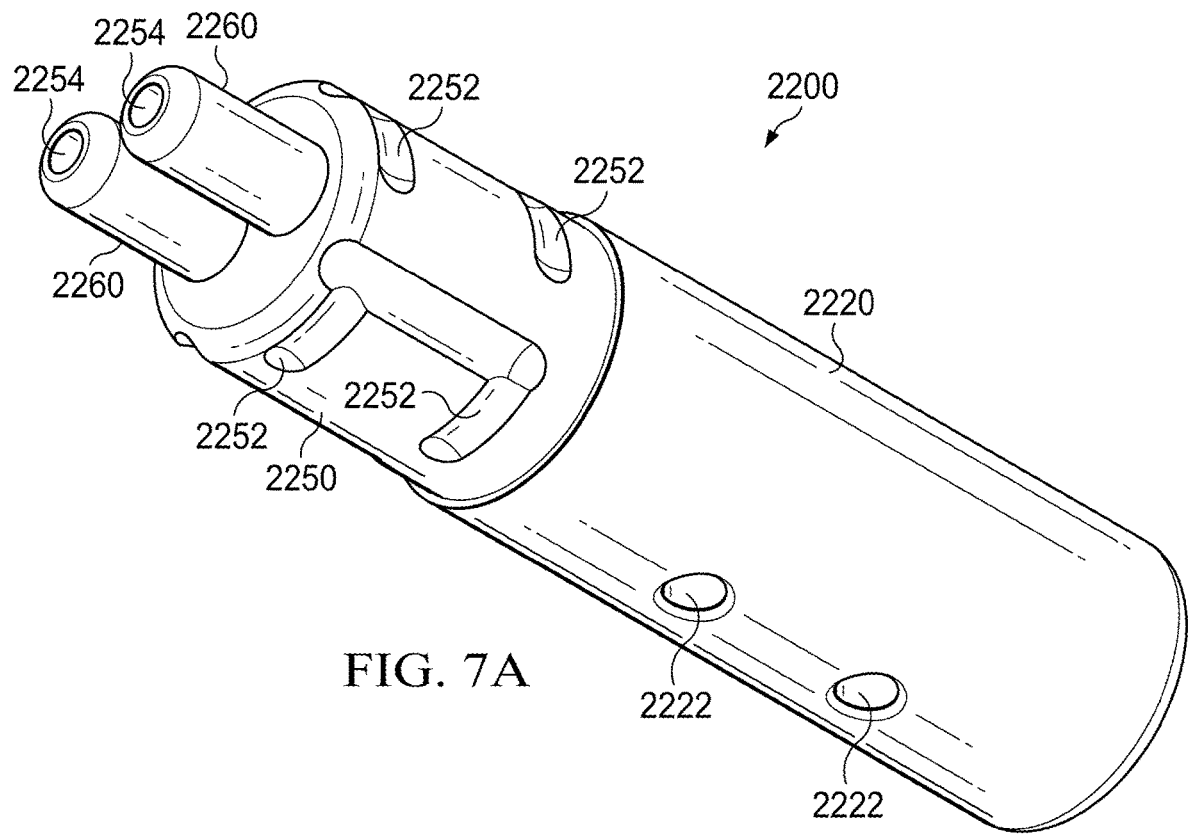
FIG. 7A is an external, perspective view of the contact tip of the welding assembly of FIG. 1 depicting various structural features of the contact tip holder.
Figure 7B:
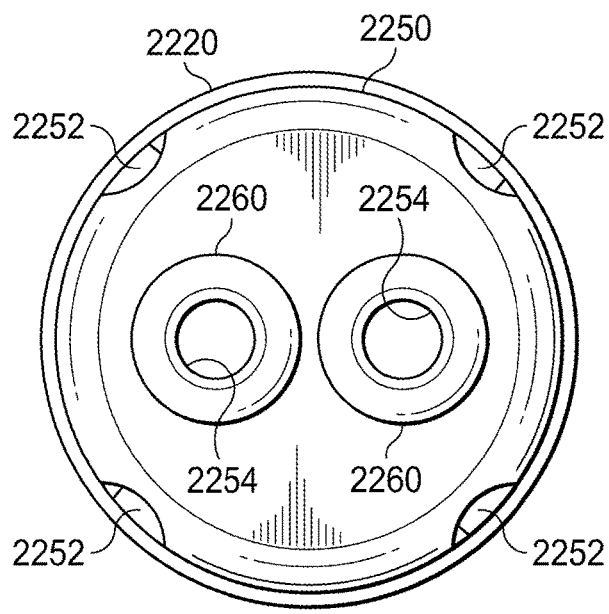
FIG. 7B is an external, end view of the contact tip of the welding assembly of FIG. 5 depicting various structural features of the contact tip holder.
Figure 8:
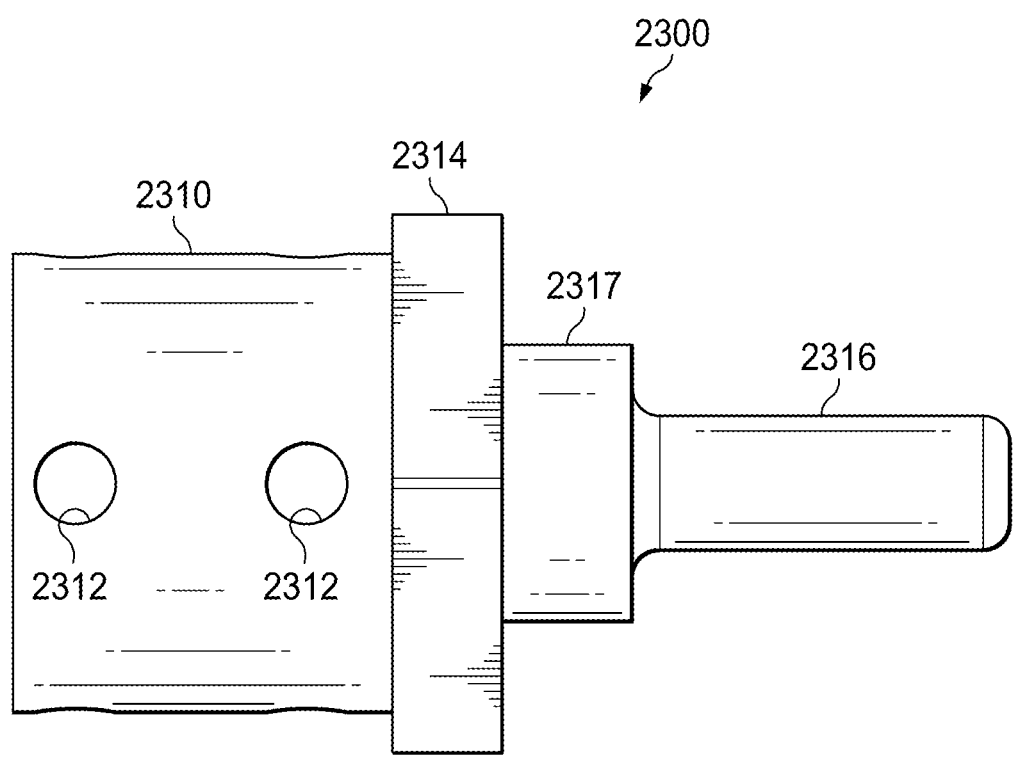
FIG. 8 is an external, perspective view of the electrode extension device of the welding assembly of FIG. 5 depicting various structural features of the electrode extension device.

FIG. 5 provides an external side view of a welding assembly in accordance with a second example implementation of the disclosed technology, wherein a contact tip holder has been configured to attach to a welding head and to an electrode extension device component or device. In this implementation, the contact tip holder has shape and geometry similar to contact tip 1200; however, the conduct tip holder (2200) does not provide electrical contact to the consumable electrode(s). In this implementation, electrical contact is provided by one or more replaceable contact tips, which may be of varying lengths. FIG. 6 provides a cross-sectional side view of the welding assembly of FIG. 5 with the welding head removed depicting the internal structure of the contact tip holder and the electrode extension device. FIG. 7A provides an external, perspective view of the contact tip holder of the welding assembly of FIG. 5 depicting various structural features of the contact tip holder. FIG. 7B provides an external, end view of the contact tip holder of the welding assembly of FIG. 5 depicting various structural features of the contact tip holder. FIG. 8 provides an external, perspective view of the electrode extension device of the welding assembly of FIG. 5 depicting various structural features of the electrode extension device.

With specific reference to FIGS. 5-6, 7A-7B, and FIG. 8, welding assembly 2000 includes welding head 2100, which is attached to contact tip holder 2200, which itself is attached to electrode extension device 2300. Single or multiple consumable electrodes 2120, which are used in various welding processes, pass completely through both contact tip holder 2200 and electrode extension device 2300. In the example implementation shown in these Figures, contact tip holder 2200 is manufactured from a single piece of material (e.g., copper or similar material) and includes welding head attachment portion 2220 and electrode extension device attachment portion 2250. Welding head 2100 of a welding gun, welding torch, or similar instrument or tool is mounted on welding head attachment portion 2220 using threaded holes 2222. In other implementations not shown in the Figures, welding head 2100 may be attached to contact tip holder 2200 using locknuts and flange arrangements or other mechanical attachment systems. Internal channels 2224 are formed within contact tip holder 2200 and provide internal passages for consumable electrodes 2120. In this implementation, replaceable contact tips 2260 are mounted on or screwed into the end portion of electrode extension device attachment portion 2250 (see FIG. 7A). Consumable electrodes 2120 pass through these replaceable tips and exit contact tip holder 2200 through exit holes 2254 (see FIG. 6). Electrode extension device attachment portion 2250, which has a diameter slightly less than the diameter of welding head attachment portion 2220 (note: in other implementations, electrode extension device attachment portion 2250 has a diameter the same as or greater than the diameter of welding head attachment portion 2220), includes a plurality of grooves 2252 formed in the surface thereof (see FIGS. 7A-7B), which may have an L-shape or other predetermined geometry. Electrode extension device 2300 includes internal cylinder 2310 in which a plurality of apertures 2312 (e.g., eight apertures) have been formed, hexagonal base 2314, and electrode housing 2316, which includes extended portion 2317 for accommodating replaceable contact tips 2260 (see FIGS. 6 and 8). Internal channels 2318 are formed within electrode extension device 2300 and provide internal passages for consumable electrodes 2120, which pass though electrode housing 2316 and exit electrode extension device 2300 through exit holes 2319 (see FIG. 6). External cylinder or sleeve 2320 is mounted over internal cylinder 2320.

As best shown in FIG. 5, electrode extension device 2300 is attached or connected to contact tip holder 2200 using an insulating bayonet-type fitting or mounting. Apertures 2312, which are formed in internal cylinder 2310 of electrode extension device 2300 (using a ball end mill or similar device), are each configured to receive a spherical, non-conductive bearing 2400 therein. The diameter of each aperture 2312 is slightly smaller than the diameter of each bearing 2400, thereby allowing bearings 2400 to be pressed into apertures 2312 to create an interference fit between the bearings and the apertures. External cylinder 2320 is then securely mounted on internal cylinder 2310 to prevent bearings 2400 from exiting apertures 2312. With bearings 2400 and external cylinder 2320 in place, electrode extension device 2300 is then mounted on electrode extension device attachment portion 2250 of contact tip holder 2200 by aligning bearings 2400 with grooves 2252 and twisting electrode extension device 2300 to form a connection between the two components. Attachment of electrode extension device 2300 to contact tip holder 2200 may be facilitated or enhanced by milling grooves 2252 to have variable characteristics such as, for example, variable depths along the length of each groove as shown in FIG. 7A. Such characteristics permit an effective interference action (i.e., twist-lock) when bearings 2400 are properly positioned in grooves 2252. Additionally, grooves 2252 and bearing 2400 are positioned to align internal channels 2318 with internal channels 2225 when electrode extension device 2300 is properly connected to contact tip holder 2200. Bearings 2400 are positioned within apertures 2312 and grooves 2252 such that insulating air gap 2500 is maintained after electrode extension device 2300 has been connected to contact tip holder 2200. After consumable electrodes 2120 have been fed through electrode extension device 2300, electrode extension device 2300 is further locked to electrode extension device attachment portion 2250. In this implementation, pocket 2600 is provided to prevent electrical contact between replaceable contact tips 2260 and electrode extension device 2300. The depth of pocket 2600 can be varied based on the length of replaceable contact tips 2260.

The disclosed electrode extension devices allow consumable electrodes such as those used in various welding processes to be extended a predetermined length from a contact tip used with a welding apparatus to a welding arc without additional electrical contact due to the insulating effect of the described connection between the contact tip device and the electrode extension device. The disclosed electrode extension devices minimize the likelihood that the consumable electrodes will collapse when the electrodes are extended from the contact tip and prevent the consumable electrodes from wandering from the intended point of welding during a welding process. Consumable electrodes may lose structural integrity and may bend due to FR heating if not guided during welding. Guidance by the disclosed electrode extension devices enables FR heating to occur within the consumable electrodes while still being continuously fed and accurately positioned at the point of welding. Structural integrity and guidance of the electrodes is further enhanced by providing internal channels in the components that are very close in diameter to the diameter of a heated electrode. The length of electrode extension may vary depending upon the size, cross section and resulting electrical resistivity of consumable electrodes and upon a desired increase in deposition rate.

The spherical bearings used with the disclosed electrode extension devices are positioned to create an air gap or barrier between the electrode extension devices and the contact tip, thereby electrically insulating the electrode extension device from the contact tip. These bearings include materials that are non-conductive for welding purposes such as, for example, silicon nitride. Silicon nitride ball bearings provide excellent high temperature properties, such as wear resistance, thermal shock resistance, and compressive strength. The compressive strength of silicon nitride is reported to be more than 430,000 psi by various manufacturers (see, for example, *Characteristics of Kyocera Technical Ceramics*; June 2004, Kyocera Ceramics of Kyoto, Japan). The high compressive strength of silicon nitride enables reliable press fitting of the disclosed bearing components into the disclosed electrode extension devices. Accordingly, using a material with high compressive strength for the nonconductive bearings results in an electrode extension device having considerable resistance to mechanical failure. In some implementations of the disclosed technology, the external and internal cylinders of the electrode extension devices are made of copper and the relatively high ductility of copper compared to silicon nitride permits effective press fitting of the bearings into the internal cylinders of the electrode extension devices.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A welding apparatus, comprising:
  an electrode extension device configured to attach to a welding contact tip device, wherein the electrode extension device includes:
    an upper portion having a predetermined length and a predetermined diameter, wherein the upper portion is configured to create an electrically insulating barrier between the electrode extension device and the welding contact tip device, and wherein the upper portion further includes
      a plurality of apertures formed therein at predetermined locations;
      an electrically non-conductive spherical bearing inserted into each aperture in the plurality of apertures such that a portion of each non-conductive spherical bearing extends a predetermined distance out of each aperture; and
      a cylindrical sleeve positioned around the upper portion of the electrode extension device to cover the apertures and bearings; and
    a lower portion having a predetermined length, wherein the lower portion is configured to receive at least one consumable welding electrode therein.

2. The welding apparatus of claim 1, wherein the electrode extension device further includes a middle portion positioned between the upper portion and the lower portion, and wherein the middle portion is greater in diameter than the upper portion and includes a predetermined geometry.

3. The welding apparatus of claim 1, wherein the welding contact tip device is configured to receive at least one consumable welding electrode therein, and wherein the welding contact tip device comprises:
a first region configured to attach to a welding head; and
a second region configured to attach to the electrode extension device, wherein the second region further includes a plurality of grooves formed thereon at predetermined locations.

4. The welding apparatus of claim 3, wherein the electrode extension device is connected to the welding contact tip device by placing the extending portions of the electrically non-conductive spherical bearings in the grooves formed on the welding contact tip device and twisting the electrode extension device to form a bayonet-type fitting.

5. The welding apparatus of claim 4, wherein the connection between the electrode extension device and the welding contact tip device defines an electrically insulating air gap between an inner surface of the upper portion of the electrode extension device and an outer surface of the welding contact tip device.

6. The welding apparatus of claim 3,
wherein the welding contact tip device is configured as a contact tip holder through which the at least one consumable welding electrode passes without receiving electrical contact, wherein the welding contact tip device is configured to receive one or more replaceable contact tips at one end thereof for providing electrical contact to the at least one consumable welding electrode, and
wherein the lower portion of the electrode extension device has been modified to include a region for housing the replaceable contact tips and forming an air pocket between the replaceable contact tips and the electrode extension device when the electrode extension device is attached to the welding contact tip device.

7. The welding apparatus of claim 1, wherein the non-conductive spherical bearings are manufactured from silicon nitride, materials containing silicon nitride, or other materials having electrically insulating properties.

8. The welding apparatus of claim 1, wherein the electrode extension device and the cylindrical sleeve are manufactured from copper, materials containing copper, or other materials capable of resisting welding heat and wear at high temperatures.

9. A welding apparatus, comprising:
welding contact tip device configured to receive at least one consumable welding electrode therein, wherein the welding contact tip device comprises:
a first region that attaches to a welding head; and
a second region that attaches to an electrode extension device, wherein the second region further includes a plurality of grooves formed thereon at predetermined locations; and
the electrode extension device, wherein the electrode extension device is configured to attach to the welding contact tip device, and wherein the electrode extension device includes:
an upper portion having a predetermined length and a predetermined diameter, wherein the upper portion is configured to create an electrically insulating barrier between the electrode extension device and the welding contact tip device, and wherein the upper portion of the electrode extension device further includes:
a plurality of apertures formed therein at predetermined locations;
an electrically non-conductive spherical bearing inserted into each aperture in the plurality of apertures such that a portion of each non-conductive spherical bearing extends a predetermined distance out of each aperture; and
a cylindrical sleeve positioned around the upper portion of the electrode extension device to cover the apertures and bearings; and
a lower portion having a predetermined length, wherein the lower portion is configured to receive the at least one consumable welding electrode therein.

10. The welding apparatus of claim 9, wherein the electrode extension device further includes a middle portion positioned between the upper portion and the lower portion, and wherein the middle portion is greater in diameter than the upper portion and includes a predetermined geometry.

11. The welding apparatus of claim 9, wherein the electrode extension device is connected to the welding contact tip device by placing the extending portions of the electrically non-conductive spherical bearings in the grooves formed on the welding contact tip and twisting the electrode extension device to form a bayonet-type fitting.

12. The welding apparatus of claim 11, wherein the connection between the electrode extension device and the welding contact tip device defines an electrically insulating air gap between an inner surface of the upper portion of the electrode extension device and an outer surface of the welding contact tip device.

13. The welding apparatus of claim 9,
wherein the welding contact tip device is configured as a contact tip holder through which the at least one consumable welding electrode passes without receiving electrical contact, wherein the welding contact tip device is configured to receive one or more replaceable contact tips at one end thereof for providing electrical contact to the at least one consumable welding electrode, and
wherein the lower portion of the electrode extension device has been modified to include a region for housing the replaceable contact tips and forming an air pocket between the replaceable contact tips and the electrode extension device when the electrode extension device is attached to the welding contact tip device.

14. The welding apparatus of claim 9,
wherein the non-conductive spherical bearings are manufactured from silicon nitride, materials containing silicon nitride or other materials having electrically insulating properties, and
wherein the electrode extension device and the cylindrical sleeve are manufactured from copper, materials containing copper, or other materials capable of resisting welding heat and wear at high temperatures.

15. A welding apparatus, comprising:
a welding contact tip device configured to receive at least one consumable welding electrode therein, wherein the welding contact tip device comprises:
a first region configured to attach to a welding head; and
a second region configured to attach to an electrode extension device, wherein the second region further includes a plurality of grooves formed thereon at predetermined locations; and the electrode extension device, wherein the electrode extension device is configured to attach to the welding contact tip, and wherein the electrode extension device includes:
- an upper portion having a predetermined length and a predetermined diameter, wherein the upper portion is configured to create an electrically insulating barrier between the electrode extension device and the welding contact tip device, and wherein the upper portion further includes:
  - a plurality of apertures formed therein at predetermined locations;
  - an electrically non-conductive spherical bearing inserted into each aperture in the plurality of apertures such that a portion of each non-conductive spherical bearing extends a predetermined distance out of each aperture; and
  - a cylindrical sleeve positioned around the upper portion of the electrode extension device to cover the apertures and bearings; and
- a lower portion having a predetermined length, wherein the lower portion is configured to receive the at least one consumable welding electrode therein; and
- a middle portion positioned between the upper portion and the lower portion, wherein the middle portion is greater in diameter than the upper portion and includes a predetermined geometry.

16. The welding apparatus of claim 15, wherein the electrode extension device is connected to the welding contact tip device by placing the extending portions of the electrically non-conductive spherical bearings in the grooves formed on the welding contact tip and twisting the electrode extension device to form a bayonet-type fitting.

17. The welding apparatus of claim 16, wherein the connection between the electrode extension device and the welding contact tip device defines an electrically insulating air gap between an inner surface of the upper portion of the electrode extension device and an outer surface of the welding contact tip device.

18. The welding apparatus of claim 15,
wherein the welding contact tip device is configured as a contact tip holder through which the at least one consumable welding electrode passes without receiving electrical contact, wherein the welding contact tip device is configured to receive one or more replaceable contact tips at one end thereof for providing electrical contact to the at least one consumable welding electrode, and
wherein the lower portion of the electrode extension device has been modified to include a region for housing the replaceable contact tips and forming an air pocket between the replaceable contact tips and the electrode extension device when the electrode extension device is attached to the welding contact tip device.

* * * * *